US012518514B2

United States Patent
Ghose et al.

(10) Patent No.: US 12,518,514 B2
(45) Date of Patent: *Jan. 6, 2026

(54) SYSTEM AND METHOD FOR DEEP LEARNING TECHNIQUES UTILIZING CONTINUOUS FEDERATED LEARNING WITH A DISTRIBUTED DATA GENERATIVE MODEL

(71) Applicant: GE PRECISION HEALTHCARE LLC, Wauwatosa, WI (US)

(72) Inventors: Soumya Ghose, Niskayuna, NY (US); Desmond Teck Beng Yeo, Clifton Park, NY (US); Thomas Kwok-Fah Foo, Clifton Park, NY (US); Chitresh Bhushan, Glenville, NY (US); Deepa Anand, Bangalore (IN); Dattesh Dayanand Shanbhag, Bangalore (IN); Radhika Madhavan, Latham, NY (US)

(73) Assignee: GE Precision Healthcare LLC, Waukesha, WI (US)

( * ) Notice: Subject to any disclaimer, the term of this patent is extended or adjusted under 35 U.S.C. 154(b) by 589 days.

This patent is subject to a terminal disclaimer.

(21) Appl. No.: 18/099,530

(22) Filed: Jan. 20, 2023

(65) Prior Publication Data

US 2023/0162487 A1    May 25, 2023

Related U.S. Application Data

(63) Continuation-in-part of application No. 17/365,650, filed on Jul. 1, 2021, now Pat. No. 12,430,565.

(51) Int. Cl.
*G06V 10/774* (2022.01)
*G06N 3/098* (2023.01)
*G06V 10/762* (2022.01)

(52) U.S. Cl.
CPC .......... *G06V 10/774* (2022.01); *G06N 3/098* (2023.01); *G06V 10/763* (2022.01)

(58) Field of Classification Search
None
See application file for complete search history.

(56) References Cited

U.S. PATENT DOCUMENTS

2020/0134446 A1\*  4/2020  Soni ..................... G06N 3/0464
2022/0051146 A1\*  2/2022  Verma .................... G06F 18/25

OTHER PUBLICATIONS

Wang, Clinton J., Natalia S. Rost, and Polina Golland. "Spatial-intensity transform GANs for high fidelity medical image-to-image translation." In International Conference on Medical Image Computing and Computer-Assisted Intervention, pp. 749-759. Cham: Springer International Publishing, 2020. (Year: 2020).\*

(Continued)

*Primary Examiner* — Vincent Gonzales
(74) *Attorney, Agent, or Firm* — Flecher Yoder, P.C.

(57) ABSTRACT

A computer implemented method is provided. The method includes establishing, via multiple processors, a continuous federated learning framework including a global model at a global site and respective local models derived from the global model at respective local sites. The method also includes retraining or retuning, via the multiple processors, the global model and the respective local models without sharing actual datasets between the global site and the respective local sites but instead sharing synthetic datasets generated from the actual datasets.

20 Claims, 11 Drawing Sheets

(56) References Cited

OTHER PUBLICATIONS

Goetz, Jack, and Ambuj Tewari. "Federated learning via synthetic data." arXiv preprint arXiv:2008.04489. 2020. (Year: 2020).*
Kirkpatrick, James, et al.; "Overcoming Catastrophic Forgetting in Neural Networks"; PNAS Mar. 28, 2017; 114(13) 3521-3526.
Heusel, Martin, et al.; "GANS Trained by a Two Time-Scale Update Rule Converge to a Local Nash Equilibrium"; NIPS, vol. 30, Dec. 2017, 38 pages.

* cited by examiner

SYSTEM AND METHOD FOR DEEP LEARNING TECHNIQUES UTILIZING CONTINUOUS FEDERATED LEARNING WITH A DISTRIBUTED DATA GENERATIVE MODEL

CROSS-REFERENCE TO RELATED APPLICATION

This application is a continuation-in-part Application of U.S. patent application Ser. No. 17/365,650, entitled "SYSTEM AND METHOD FOR DEEP LEARNING TECHNIQUES UTILIZING CONTINUOUS FEDERATED LEARNING WITH A DISTRIBUTED DATA GENERATIVE MODEL", filed Jul. 1, 2021, which is herein incorporated.

BACKGROUND

The subject matter disclosed herein relates to deep learning techniques and, more particularly, to systems and methods for deep learning techniques utilizing continuous federated learning with a distributed data generative model.

Deep learning models have been proven successful in addressing problems involving sufficiently large, balanced and labeled datasets that appear in computer vision, speech processing, image processing, and other problems. Ideally, it is desired that these models continuously learn and adapt with new data, but this remains a challenge for neural network models since most of these models are trained with static large batches of data. Retraining with incremental data generally leads to catastrophic forgetting (i.e. training a model with new information interferes with previously learned knowledge).

Ideally, artificial intelligence (AI) learning systems should adapt and learn continuously with new knowledge while refining existing knowledge. Current AI learning schemes assume that all samples are available during the training phase and, therefore, requires retraining of the network parameters on the entire dataset in order to adapt to changes in the data distribution. Although retraining from scratch pragmatically addresses catastrophic forgetting, in many practical scenarios, data privacy concerns do not allow for sharing of training data. In those cases, retraining with incremental new data can lead to significant loss of accuracy (catastrophic forgetting).

In addition, in the medical imaging domain (no matter how large the dataset), balanced and manually labelled datasets capturing all variabilities are rare. In presence of datasets that significantly differ from the training data in terms of appearance/contrast, shape (of organs/structures of interest) and field of view, model performance may be adversely affected. Current deep learning schemes assume that all samples are available during the training phase and, therefore, require retraining of the network parameters on the entire dataset in order to adapt to changes in the data distribution. However, such retraining is expensive as it involves a large amount of data acquisition and manual annotations for ground truth generation for those data.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a computer implemented method is provided. The method includes establishing, via multiple processors, a continuous federated learning framework including a global model at a global site and respective local models derived from the global model at respective local sites. The method also includes retraining or retuning, via the multiple processors, the global model and the respective local models without sharing actual datasets between the global site and the respective local sites but instead sharing synthetic datasets generated from the actual datasets.

In another embodiment, a deep learning-based continuous federated learning network system is provided. The system includes a global site including a global model. The system also includes multiple local sites, wherein each respective local site of the multiple local sites includes a respective local model derived from the global model. The system further includes multiple processors configured to retrain or retune the global model and the respective local models without sharing actual datasets between the global site and the respective local sites but instead sharing synthetic datasets generated from the actual datasets.

In a further embodiment, a non-transitory computer-readable medium, the computer-readable medium including processor-executable code that when executed by one or more processors, causes the one or more processors to perform actions. The actions include establish a continuous federated learning framework comprising a global model at a global site and respective local models derived from the global model at respective local sites. The actions also include retraining or retuning the global model and the respective local models without sharing actual datasets between the global site and the respective local sites but instead sharing synthetic datasets or models generated from the actual datasets.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
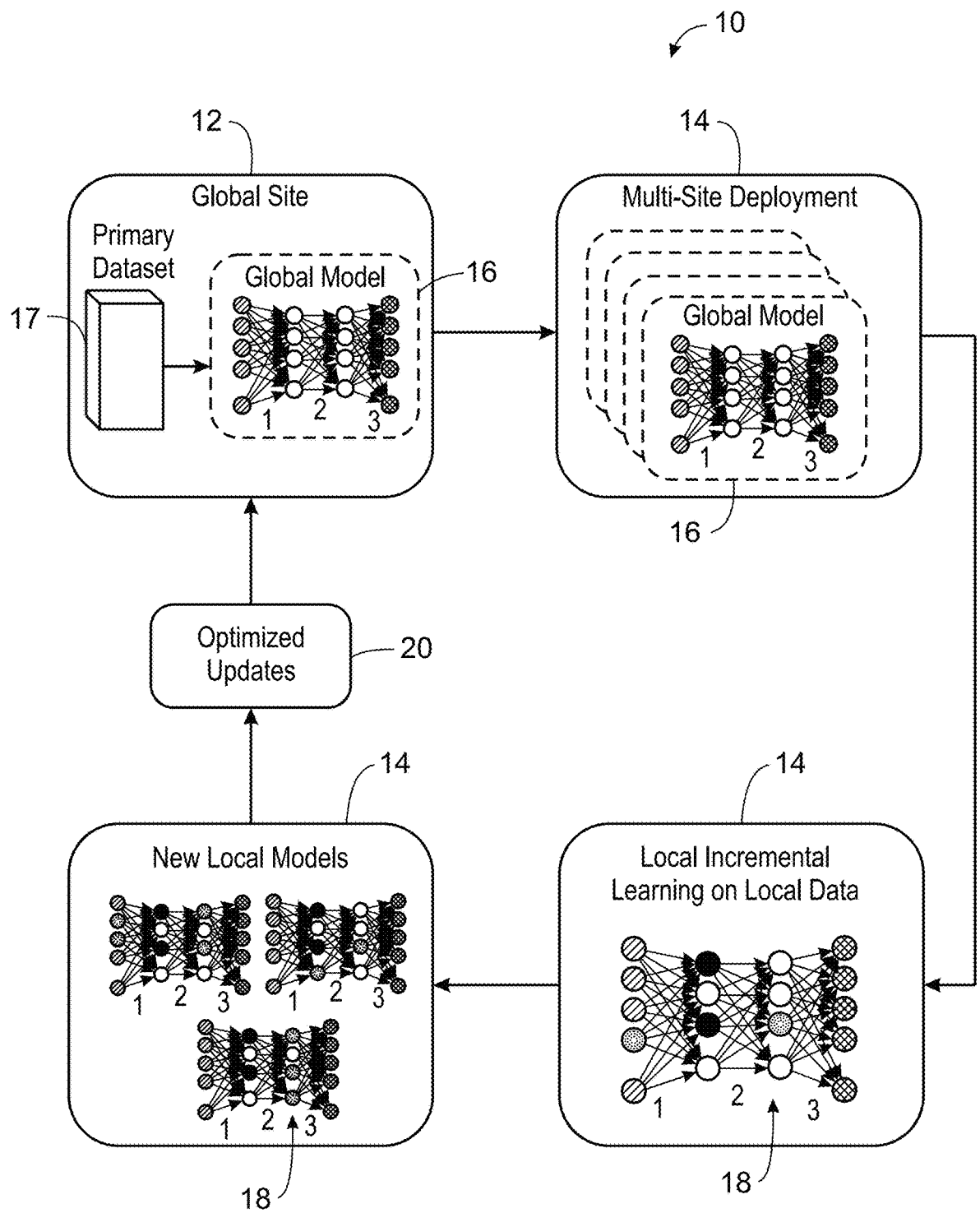
FIG. 1 is an embodiment of a schematic diagram of a continuous federated learning scheme or scenario, in accordance with aspects of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

Some generalized information is provided to provide both general context for aspects of the present disclosure and to facilitate understanding and explanation of certain of the technical concepts described herein.

Deep-learning (DL) approaches discussed herein may be based on artificial neural networks, and may therefore encompass one or more of deep neural networks, fully connected networks, convolutional neural networks (CNNs), perceptrons, encoders-decoders, recurrent networks, wavelet filter banks, u-nets, generative adversarial networks (GANs), or other neural network architectures. The neural networks may include shortcuts, activations, batch-normalization layers, and/or other features. These techniques are referred to herein as deep-learning techniques, though this terminology may also be used specifically in reference to the use of deep neural networks, which is a neural network having a plurality of layers.

As discussed herein, deep-learning techniques (which may also be known as deep machine learning, hierarchical learning, or deep structured learning) are a branch of machine learning techniques that employ mathematical representations of data and artificial neural networks for learning and processing such representations. By way of example, deep-learning approaches may be characterized by their use of one or more algorithms to extract or model high level abstractions of a type of data-of-interest. This may be accomplished using one or more processing layers, with each layer typically corresponding to a different level of abstraction and, therefore potentially employing or utilizing different aspects of the initial data or outputs of a preceding layer (i.e., a hierarchy or cascade of layers) as the target of the processes or algorithms of a given layer. In an image processing or reconstruction context, this may be characterized as different layers corresponding to the different feature levels or resolution in the data. In general, the processing from one representation space to the next-level representation space can be considered as one 'stage' of the process. Each stage of the process can be performed by separate neural networks or by different parts of one larger neural network.

Deep neural nets combine feature representation learning and classifiers in a unified framework and have proven successful in many a problem involving sufficiently large, balanced and labeled datasets that appear in computer vision, speech processing, and image processing, and other problems. However, problems related to healthcare or in-flight monitoring offer a different set of challenges like limited data, diversity in sample distributions, and limited or no access to training data. Transfer learning is a common framework to retrain models given new incoming data but these set of models suffer from catastrophic forgetting (i.e., catastrophic loss of previously learned responses, whenever an attempt is made to train the network with a single new (additional) response). The challenge is to learn and adapt with new incoming data, while retaining memory of previously learned responses. This is further challenging in scenarios where the data at a site cannot be shared with a global or central site for retraining. In this case, the model should be able to adapt and learn online with data only from the site where it is deployed.

Standard deep learning models are trained on centralized training data. Performance of a deep learning models may be adversely affected from site-specific variabilities like machine make, software versions, patient demographics, and site-specific clinical preferences. Federated learning enables incremental site-specific tuning of the global model to create local versions. Such models are more robust to site specific variabilities. Local models from multiple local sites are then further sent to the cloud using encrypted communication for fine tuning of the global model. During the process performance standard has to be maintained in global and local test dataset to adhere to regulatory authorities.

The present disclosure provides for a data generation framework that enables estimating and generating synthetic or generative samples derived from global and local datasets to resolve the issue of data sharing privacy. Tuning/retraining of the weights and global model updating occurs utilizing the synthetic or generative samples (mitigating the issue of data privacy) from a distribution that closely resembles global and local dataset distribution in a federated-like learning framework. This enables local learning at the site level to account for site-specific preferences while maintaining global performance (mitigating the issue of catastrophic forgetting).

Distributed local incremental learning and fine tuning ensures better performance compared to a global model trained with data from foreign sites. Such a model by design is generalizable across multiple industries including aviation, healthcare, power, additive manufacturing, and robotics. By making the updating of the weights of the global model dependent on the synthetic or generative samples derived from the global dataset, it ensures the licensed/validated global model architecture is maintained and local weights are fine tuned to better fit to local preferences, thus, improving performance over time without catastrophic forgetting.

For example, as described below, a continuous federated learning framework including a global model at a global site and respective local models derived from the global model at respective local sites may be established. The retraining or retuning of the global model and the respective local models occurs without sharing actual datasets between the global site and the respective local sites but instead sharing synthetic datasets generated from the actual datasets. This enables the diversity of the data distribution to be captured at the particular sites (e.g., local sites). Also, the efficiency of training (i.e., retraining/retuning) is increased.

As mentioned above, the presence of datasets that significantly differ from the training dataset in terms of appearance/contrast, shape (of organs/structures of interest) and field of view, model performance may be adversely affected. For example, differences in T2-weighted contrast between MRI images of pediatric patients and adult patient cause deep learning segmentation failures. The present disclosure provides a hybrid framework for unsupervised learning and supervised learning of transforming contrast for T2-weighted images. The disclosed embodiments enable local sites and a global site to utilize a tissue specific regression model (e.g., non-linear regression model) to transform the contrast of a T2-weighted pediatric image to match the contrast of a T2-weighted adult image (or vice versa). It should be noted although the following examples are discussed with regard to variable contrast differences between a cohort of pediatric images and a cohort of adult images, the disclosed techniques may apply to any two cohorts having variable contrast differences. The disclosed embodiments enable transforming contrast similar to a training dataset improves deep learning performance for vertebra segmentation (or the segmentation of any organ or structure of interest). The disclosed techniques even though discussed with regard to the vertebrae can apply to other organs or structures (e.g., knee, brain, etc.) as long as different tissue types can be derived from the images. Such guided non-linear contrast transformation enables current deep learning models (e.g., at local sites and/or a global site) to perform without failures. Compared to a deep learning GAN-based model for contrast transformation/generation that often requires large paired or un-paired dataset for learning the transformation parameters, the hybrid model learns from a single dataset without any manual intervention or annotation and graphics processing unit requirement resulting in minimal disruption in local sites. In addition, no retraining of the existing deep learning model (e.g., at the local site) is necessary for performance improvement of the existing model.

With the preceding in mind, and by way of providing useful context, FIG. 1 depicts a schematic diagram of a continuous federated learning scheme or scenario 10. Standard deep learning models are trained on centralized training data. Performance of a deep learning models may be adversely affected from site-specific variabilities like machine make, software versions, patient demographics and site-specific clinical preferences. As depicted, the continuous federated learning scheme 10 includes a global site 12 (e.g., central or main site) and multiple local sites or nodes 14 (e.g., remote from the global site 12). The global site 12 includes a global model 16 (e.g., global neural network or machine learning model) trained on a primary dataset 17 (e.g., global dataset). Federated learning enables incremental site-specific tuning of the global model 16 (via local incremental learning on local data) to create local versions 18. Such models are more robust to site specific variabilities. Local models 18 (e.g., local neural network or machine learning model) from local sites 14 are then further sent to the cloud using encrypted communication for fine tuning of the global model 16. During the process, a performance standard has to be maintained in global and local test datasets.

In the continuous federated learning scenario 10, the global model 16 is deployed across multiple sites 14 that cannot export data. A site-specific ground truth is generated using auto-curation models that may use segmentation, registration machine learning, and/or deep learning models. The site-specific ground truth may have to be refined depending on local preferences of the expert. An automatically generated and refined ground truth is then further used for local training of the models. Selective local updates of the weights of the global model 16 creates a local mutant 18 of the global model 16. The weights of the local models 18 are then encrypted and sent to the central server for selective updating of the global model 16 as indicated by block 20. These local updates or site-specific preferences (e.g., weights) from the local sites 14 are combined when updating the global model 16 at the global site 12. The global model update would be strategic and would be dependent on domain and industry specific requirements.

Figure 2:
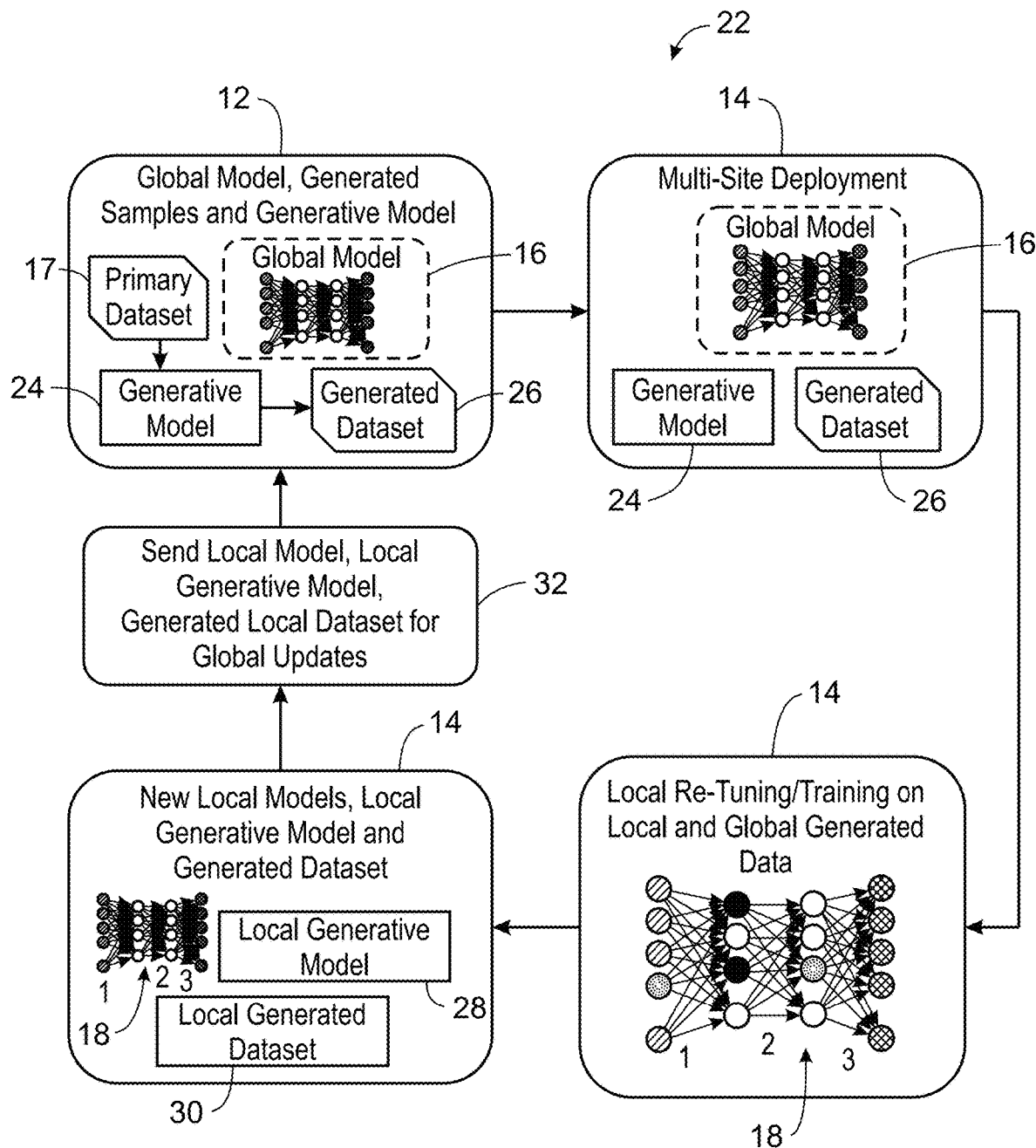
FIG. 2 is an embodiment of a schematic diagram of a continuous federated learning scheme or scenario (e.g., utilizing distributed data generative models), in accordance with aspects of the present disclosure.

FIG. 2 depicts a continuous federated learning scheme or scenario 22 that utilizes distributed data generative models to resolve issues with data privacy (or high volume data that cannot be stored) and catastrophic forgetting. The continuous federated learning scheme 22 includes a global site 12 (e.g., central or main site) and multiple local sites or nodes 14 (e.g., remote from the global site 12). The global site 12 includes a global model 16 (e.g., global neural network or machine learning model) trained on a primary dataset 17 (e.g., global dataset) of actual or true data. During multi-site deployment, each local site 14 also receives the global model 16 as initially trained at the global site 12. At the global site 12, a generative model 24 (e.g., global generative model) utilizes the primary dataset 17 to synthesize or generate a synthetic or generated (e.g., generative) dataset 26 (e.g., global synthetic or generated dataset) similar to the primary dataset 17. The synthesized or generated dataset 26 derived from the primary dataset 17 reflects the distribution of the actual or true data in the primary dataset 17. The generative model 24 may be created utilizing variational autoencoders, a generative adversarial network, data augmentation, and/or regression methods. The generative model 24 and the generated dataset 26 are distributed to each of the local sites 14 via multi-site deployment.

At the local sites 14, the generated dataset 26 and a local dataset (actual or true local data) are combined for utilization in the local retuning/retraining of the global model 16 to generate a new local model 18. Also, at the local sites 14, a local generative model 28 is created from the generative model 24 and the local dataset. The local generative model 28 utilizes the local dataset to synthesize or generate a synthetic or generated (e.g., generative) dataset 30 (e.g., local synthetic or generated dataset) similar to the primary dataset 17. The local synthesized or generated dataset 30 derived from the local dataset reflects the distribution of the actual or true data in the local dataset 17. The new local models 18, the local generative models 28, and the local generated datasets 30 from each of the local sites 14 are then encrypted and sent to the central server for selective updating/retuning/retraining of the global model 16 as indicated by block 32. A retrained global model may then be provided to the local sites 14. This process may occur in an iterative manner. Over time, after repeating the cycle iteratively, the respective local generative model 28 and the generative model 24 should eventually have the same distribution (i.e., the models 24, 28 will converge at least with regard to mean and variance).

Retraining using synthetic samples similar to global and local datasets ensures data privacy and mitigates catastrophic forgetting. Creating generative models configured to generate synthetic samples similar to those at the global and local sites ensures global and local data distribution is captured enabling training (e.g., retraining) of a neural network in a continuous federated learning framework without data sharing.

Figure 3:
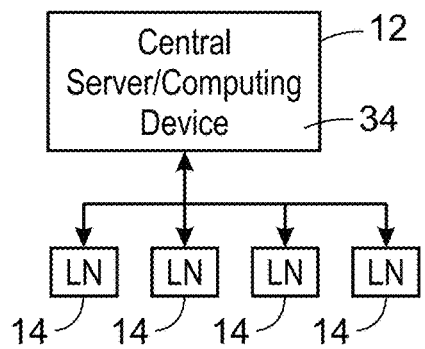
FIG. 3 is an embodiment of a schematic diagram of a centralized arrangement for a global site and local sites, in accordance with aspects of the present disclosure.

The global site 12 and the local sites 14 may be arranged in a centralized arrangement as depicted in FIG. 3. For example, the global site 12 may be located at one or more central or main servers or computing devices at a central or main site. The local sites or nodes 14 may be located remotely from the location of the global site 12. Each local site or node 14 may include one or more servers or computing devices. The global site 12 and the local sites 14 may be interconnected via the Internet. In certain embodiments, the global site 12 and the local sites may be interconnected via a cloud or a cloud computing environment. As used herein, the term "cloud" or "cloud computing environment" may refer to various evolving arrangements, infrastructure, networks, and the like that will typically be based upon the Internet. The term may refer to any type of cloud, including client clouds, application clouds, platform clouds, infrastructure clouds, server clouds, and so forth.

Figure 4:
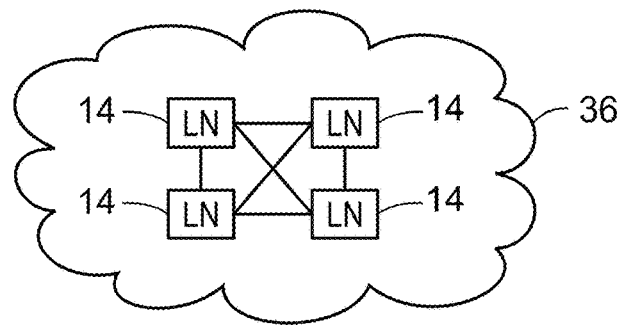
FIG. 4 is an embodiment of a schematic diagram of a decentralized arrangement for a global site and local sites, in accordance with aspects of the present disclosure.

Alternatively, the global site 12 and the local sites 14 may be arranged in a decentralized arrangement as depicted in FIG. 4. In the decentralized arrangement, the global site 12 does not truly exist (but is maintained, for example, in a cloud environment) by the local sites 14 which are configured to coordinate between themselves. For example, a cloud computing environment 36 includes a plurality of distributed nodes 14 (e.g., local sites). The computing resources of the nodes 14 are pooled to serve multiple consumers, with different physical and virtual resources dynamically assigned and reassigned according to consumer demand. Examples of resources include storage, processing, memory, network bandwidth, and virtual machines. The nodes 14 may communicate with one another to distribute resources, and such communication and management of distribution of resources may be controlled by a cloud management module, residing on one or more nodes 14. The nodes 14 may communicate via any suitable arrangement and protocol. Further, the nodes 14 may include servers associated with one or more providers. For example, certain programs or software platforms may be accessed via a set of nodes 14 provided by the owner of the programs while other nodes 14 are provided by data storage companies. Certain nodes 14 may also be overflow nodes that are used during higher load times.

Figure 5:
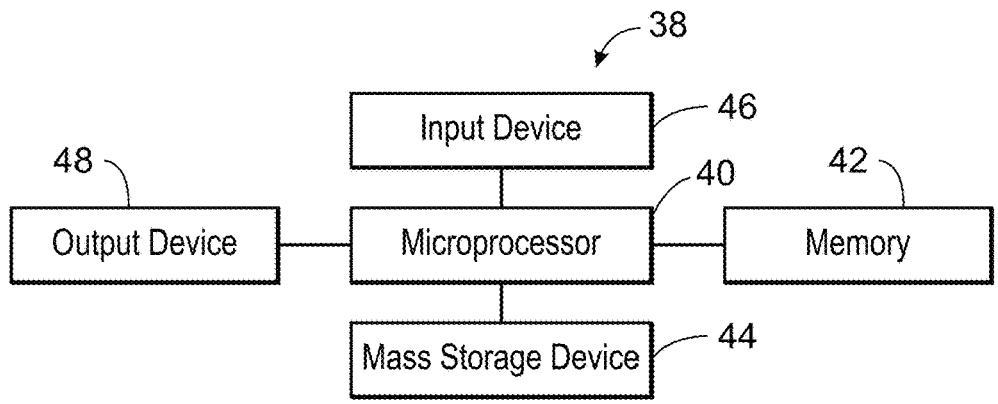
FIG. 5 is a block diagram of a processor-based device or system that may be configured to implement functionality described herein, in accordance with aspects of the present disclosure.

FIG. 5 is a block diagram of a processor-based device or system 38 that may be configured to implement functionality described herein in accordance with one embodiment. Various functionality, as described herein, may be performed by, or in conjunction with, a processor-based system 38, which is generally depicted in FIG. 5 in accordance with one embodiment. For example, the various computing devices or servers (e.g., utilized at the global site and/or local sites) herein may include, or be partially or entirely embodied in, a processor-based system, such as that presently illustrated. The processor-based system 38 may be a general-purpose computer, such as a personal computer, configured to run a variety of software, including software implementing all or part of the functionality described herein. Alternatively, in other embodiments, the processor-based system 38 may include, among other things, a distributed computing system, or an application-specific computer or workstation configured to implement all or part of the presently described functionality based on specialized software and/or hardware provided as part of the system. Further, the processor-based system 38 may include either a single processor or a plurality of processors to facilitate implementation of the presently disclosed functionality.

In one embodiment, the exemplary processor-based system 38 includes a microcontroller or microprocessor 40, such as a central processing unit (CPU), which executes various routines and processing functions of the system 38. For example, the microprocessor 40 may execute various operating system instructions, as well as software routines configured to effect certain processes, stored in or provided by a manufacture including one or more computer readable-media (at least collectively storing the software routines), such as a memory 42 (e.g., a random access memory (RAM) of a personal computer) or one or more mass storage devices 44 (e.g., an internal or external hard drive, a solid-state storage device, a CD-ROM, a DVD, or another storage device). In addition, the microprocessor 40 processes data provided as inputs for various routines or software programs, such as data provided as part of the present subject matter described herein in computer-based implementations.

Such data may be stored in, or provided by, the memory 42 or mass storage device 44. The memory 42 or the mass storage device may store various datasets (e.g., actual datasets such as the global dataset or local dataset, local synthetic dataset, global synthetic dataset, etc.), various deep learning or machine learning models (e.g., global modes, local models, global generative model, local generative model, etc.), and other information. Alternatively, such data may be provided to the microprocessor 40 via one or more input devices 46. The input devices 46 may include manual input devices, such as a keyboard, a mouse, touchscreen (e.g., on tablet), or the like. In addition, the input devices 46 may include a network device, such as a wired or wireless Ethernet card, a wireless network adapter, or any of various ports or devices configured to facilitate communication with other devices via any suitable communications network, such as a local area network or the Internet. Through such a network device, the system 38 may exchange data and communicate with other networked electronic systems, whether proximate to or remote from the system 38.

Results generated by the microprocessor 40, such as the results obtained by processing data in accordance with one or more stored routines, may be provided to an operator via one or more output devices 48 (e.g., a display). Communication between the various components of the processor-based system 38 may typically be accomplished via a chipset and one or more busses or interconnects which electrically connect the components of the system 38.

Figure 6:
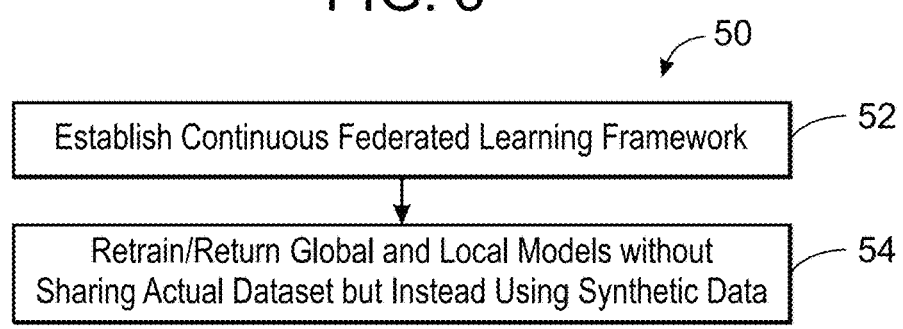
FIG. 6 is an embodiment of a flow chart of a method for retraining local and global models, in accordance with aspects of the present disclosure.

FIG. 6 is a flow chart of a method 50 for retraining local and global models in a continuous federated learning framework. One or more components (e.g., processor-based devices 38 in FIG. 5) of the global site 12 and/or the local sites 14 in FIG. 2 may be utilized for performing the method 50. One or more steps of the method 50 may be performed simultaneously or in a different order from that depicted in FIG. 6. It is assumed in the continuous federated learning framework that global and local datasets are available at the global site and the local sites, respectively, and generated trained models.

The method 50 includes establishing a continuous federated learning framework including a global model at a global site and respective local models derived from the global model at respective local sites (block 52). Establishing the continuous federated learning framework may include generating a trained global model (e.g., utilizing an actual global dataset) and validating the trained global model (e.g., utilizing an actual global test dataset held out from or separate from the actual global dataset) at a global site (e.g., central or main site). Establishing the continuous federated learning framework may also include providing the trained global model to multiple local sites or nodes remote from the global site. This may include at each local site accessing the trained global model from a database or memory available to each local site.

The method 50 also includes retraining or retuning the global model and the respective local models without sharing actual datasets between the global site and the respective local sites but instead sharing synthetic or generative datasets generated from the actual datasets (block 54). Actual datasets (e.g., actual global dataset and respective actual local datasets) are not shared (e.g., due to data privacy or a high volume of data that cannot be stored) between the local sites or between the global site and the local sites.

Figure 7:
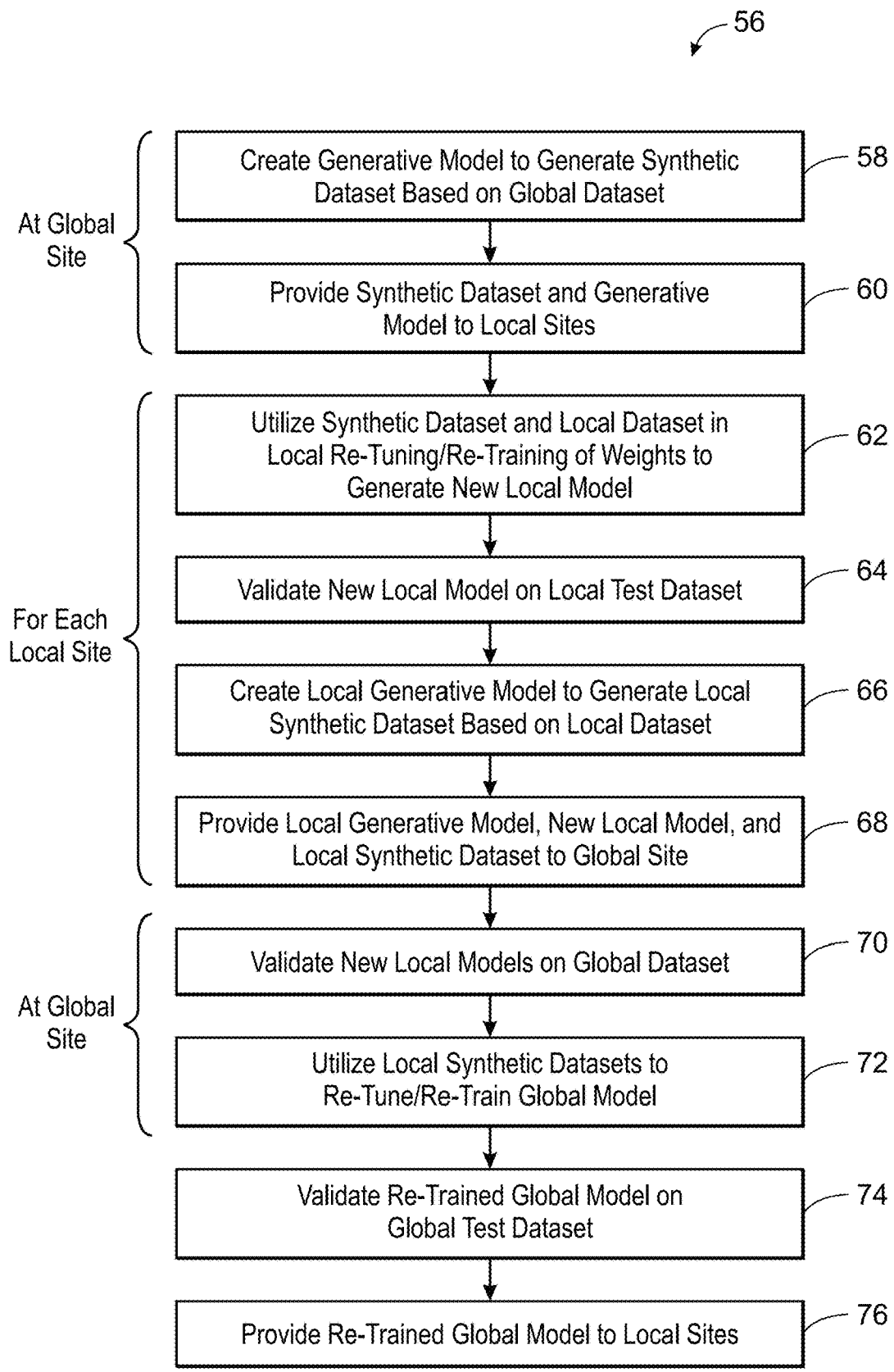
FIG. 7 is an embodiment of a flow chart of a method for retraining local and global models, in accordance with aspects of the present disclosure.

FIG. 7 is a flow chart of a method 56 for retraining local and global models in a continuous federated learning framework. One or more components (e.g., processor-based devices 38 in FIG. 5) of the global site 12 and/or the local sites 14 in FIG. 2 may be utilized for performing the method 50. One or more steps of the method 56 may be performed simultaneously or in a different order from that depicted in FIG. 7. It is assumed in the continuous federated learning framework that global and local datasets are available at the global site and the local sites, respectively, and generated trained models. It also assumed that each local site includes a trained local model (e.g., trained on an actual local dataset) derived from the trained global model at the global site.

The method 56 includes, at the global site, creating or generating a generative model configured to generate a synthetic or generated global dataset similar to and based on the actual global dataset utilizing the actual global dataset (block 58). In certain embodiments, the generative model may be created utilizing variational autoencoders, a generative adversarial network, data augmentation, and/or regression methods. In certain embodiments, the generative model (e.g., global generative model) is configured to perform guided non-linear guided transformation between pediatric and adult vertebrae magnetic resonance (MR) images. In certain embodiments, the generative model is configured to transform a contrast of pediatric vertebrae MR images to resemble a contrast of adult vertebrae MR images. In certain embodiments, the generative model is configured to transform a contrast of pediatric vertebrae MR images to resemble a contrast of adult vertebrae MR images. In certain embodiments, the generative model is a tissue specific non-linear regression model. In certain embodiments, the generative model is configured, prior to performing guided non-linear contrast transformation, to utilize expectation maximization clustering to identify different tissue classes in vertebrae MR images.

The method 56 also includes, at the global site, providing the generative model and the synthetic global dataset to each of the respective local sites (block 60). The method 56 further includes, at each local site, retraining or retuning each respective local model utilizing both the synthetic global dataset and an actual local dataset at the respective local site to locally retune weights to generate a new respective local model (block 62). The method 56 even further includes, at each local site, validating each new respective local model utilizing an actual local test dataset at the respective local site (without catastrophic forgetting) (block 64). The actual local test dataset is held out from or separate from the actual local dataset utilized for training the local model and generating the generative local dataset. The method 56 still further includes, at each local site, creating or generating a local generative model configured to generate a synthetic or generated local dataset similar to and based on the actual local dataset utilizing the actual local dataset (block 66). The global generative model may also be utilized in generating the local generative model. In particular, the global generative model at the local site may be retuned or retrained utilizing the actual local dataset. In certain embodiments, the local generative model is configured to perform guided non-linear contrast transformation between pediatric and adult vertebrae magnetic resonance (MR) images. In certain embodiments, the local generative model is configured to transform a contrast of pediatric vertebrae MR images to resemble a contrast of adult vertebrae MR images. In certain embodiments, the local generative model is configured to transform a contrast of adult vertebrae MR images to resemble a contrast of adult vertebrae MR images. In certain embodiments, the local generative model is a tissue specific non-linear regression model. In certain embodiments, the local generative model is configured, prior to performing guided non-linear contrast transformation, to utilize expectation maximization clustering to identify different tissue classes in vertebrae MR images. In certain embodiments, the local generative model may be trained utilizing an actual local dataset. In particular, the local generative model may be trained utilizing a couple of un-paired T2-weighted MR images comprising a T2-weighted pediatric vertebrae MR image and a T2-weighted adult vertebrae MR image.

The method 56 includes, at each local site, providing the respective local generative model, the new respective local model, and the respective synthetic local dataset to the global site (block 68). The method 56 also includes, at the global site, validating each new respective local model utilizing an actual global test dataset (block 70). The actual global test dataset is held out from or separate from the actual global dataset utilized for training the global model and generating the generative global dataset.

The method 56 includes, at the global site, retraining or retuning the global model utilizing the respective synthetic local datasets from each of the respective local sites to retune global weights to generate a retrained global model (block 72). The method 56 also includes, at the global site, validating the retrained global model utilizing the actual global test dataset (block 74). The method 56 further includes, at the global site, providing the retrained global model to each of the respective local sites (block 76). The steps of the method 56 may then be repeated in an iterative manner.

Figure 8:
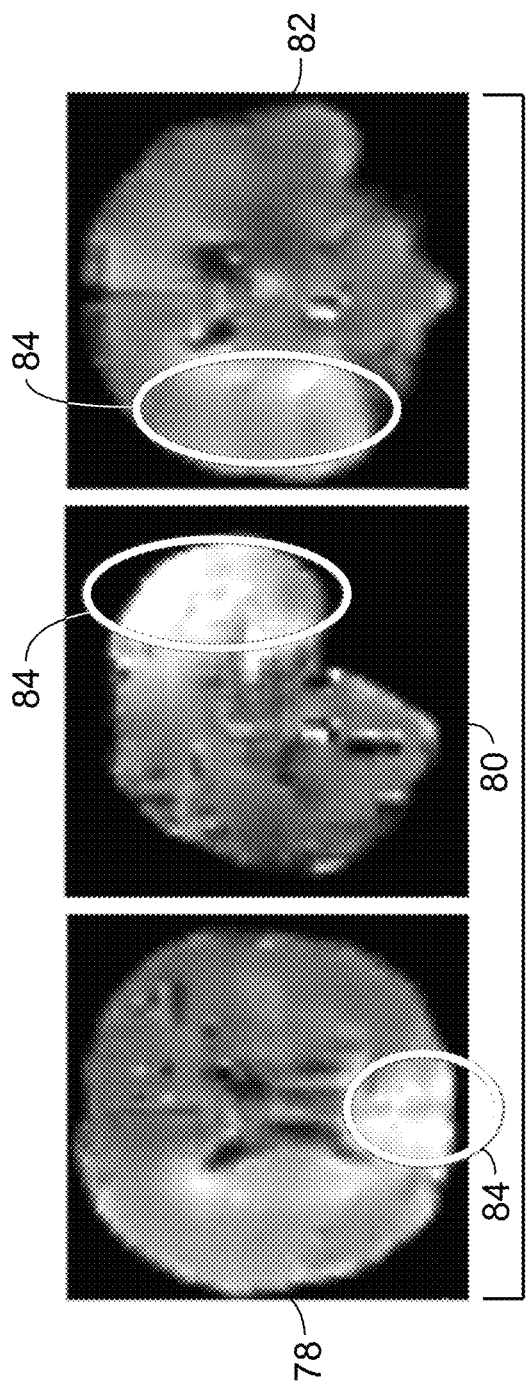
FIG. 8 illustrate examples of synthetic medical images (e.g., FLAIR MRI images) generated with a generative model, in accordance with aspects of the present disclosure.
Figure 9:
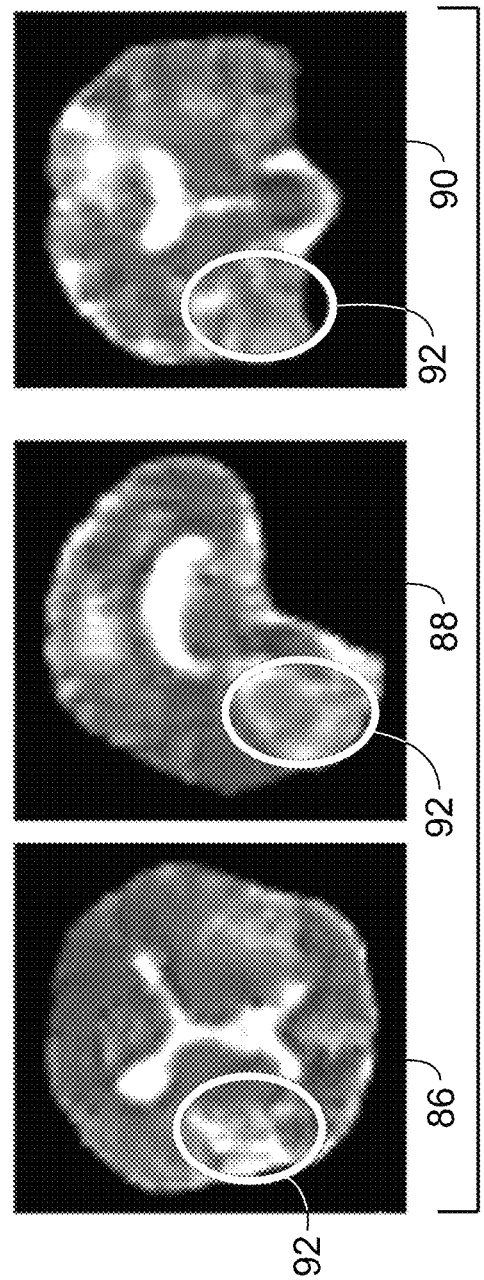
FIG. 9 illustrate examples of synthetic medical images (e.g., T2 MRI images) generated with a generative model, in accordance with aspects of the present disclosure.

The systems and methods described above may be utilized on a variety of types of data in various industries (e.g., healthcare, aviation, etc.). One example of data that may be utilized is imaging data (e.g., medical imaging data) acquired from medical imaging systems. FIGS. 8 and 9 provide examples of synthetic medical images generated by global or local generative models via simulated data distribution based on actual medical images. FIG. 8 includes synthetic images 78, 80, and 82 of magnetic resonance (MR) images of the brain acquired with a fluid-attenuated inversion recovery (FLAIR) MRI sequence. Circles 84 indicate synthetic lesions generated in the synthetic images 78, 80, and 82. FIG. 9 includes synthetic images 86, 88, and 90 of MR images of the brain acquired with a T2 MRI sequence. Circles 92 indicate synthetic lesions generated in the synthetic images 86, 88, and 90.

Figure 10:
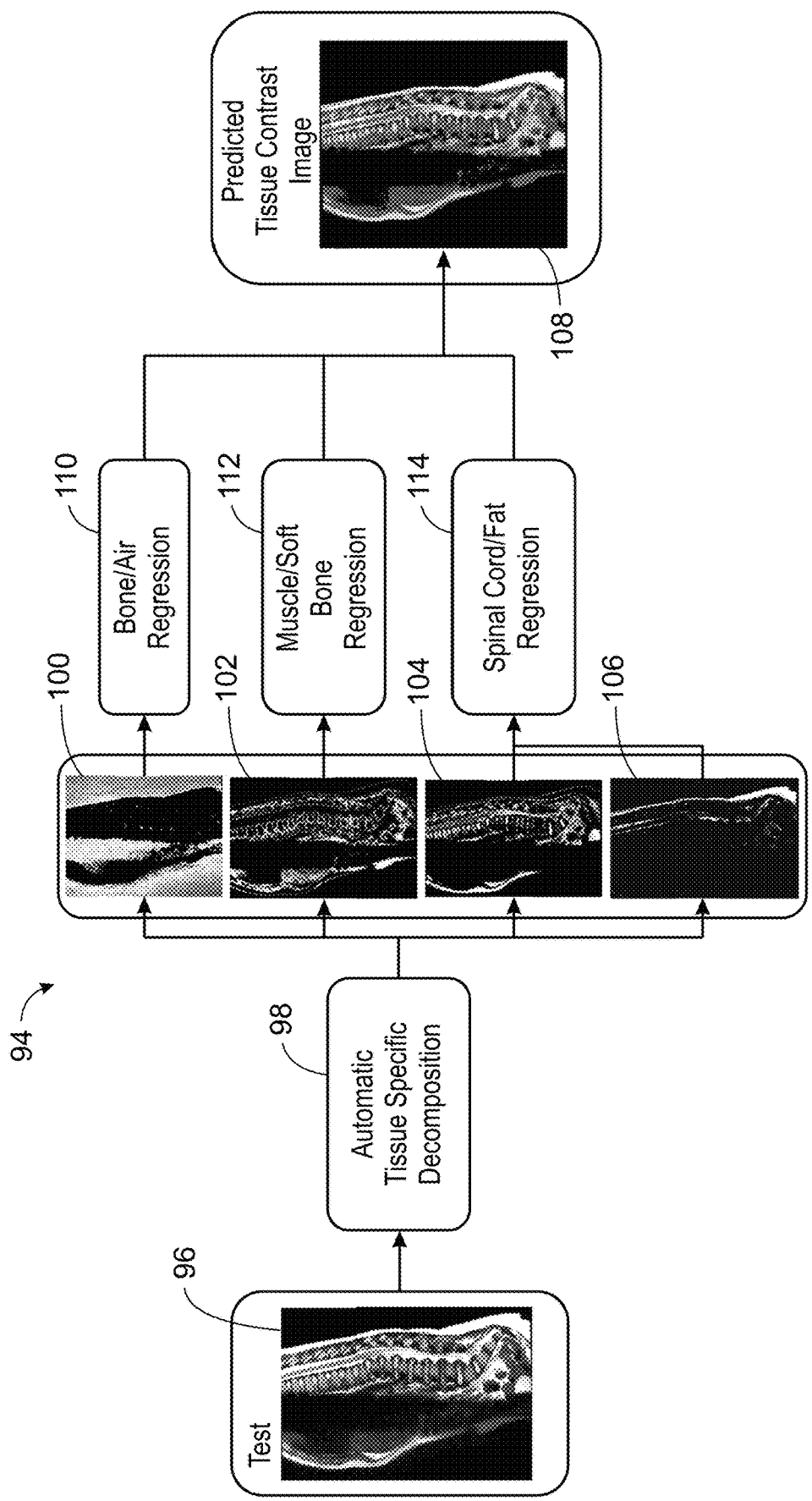
FIG. 10 is an embodiment of a schematic diagram of utilization of a trained generative model for guided tissue contrast transformation between pediatric vertebrae magnetic resonance images and adult vertebrae magnetic resonance images, in accordance with aspects of the present disclosure.

FIG. 10 is an embodiment of a schematic diagram of utilization of a trained generative model 94 (e.g., generative model 24 or local generative model 28 in FIG. 2) for guided tissue contrast transformation between pediatric vertebrae MR images and adult vertebrae MR images. As depicted, an image 96 (e.g., test image) is inputted into the trained generative model 94. In certain embodiments, the image 96 is derived from actual data at the global site or the local site. As depicted, the image 96 is a pediatric vertebrae MR image (e.g., T2-weighted pediatric vertebrae MR image). In certain embodiments, the image 96 is an adult vertebrae MR image (e.g., T2-weighted adult vertebrae MR image). The trained generative model 94 automatically performs tissue specific decomposition (e.g., utilizing expectation maximization (EM)-based clustering) as indicated by reference numeral 98 to identify different classes of tissue within the image 96. In particular, a bone/air decomposition image 100, a muscle/soft bone image 102, a muscle/spinal cord image 104, and a fat decomposition image 106 are generated from the image 96. The trained generative model 94 than utilizes non-linear regression to generate a predicted tissue contrast image 108 from the decomposition images 100, 102, 104, and 106. As depicted, the predicted tissue contrast image 108 is a pediatric vertebrae MR image (e.g., T2-weighted pediatric vertebrae MR image) having a contrast/intensity that matches a contrast/intensity of an adult vertebrae MR image (e.g., T2-weighted adult vertebrae MR image). In certain embodiments (when the inputted image is an adult vertebrae MR image), the predicted tissue contrast image 108 is an adult vertebrae MR image (e.g., T2-weighted adult vertebrae MR image) having a contrast/intensity that matches a contrast/intensity of a pediatric vertebrae MR image (e.g., T2-weighted pediatric vertebrae MR image). Thus, the trained generative model 94 performs guided non-linear contrast transformation between pediatric and adult vertebrae MR images. As depicted, the trained generative model 94 utilizes tissue specific regression models (e.g., bone/air regression model 110, muscle/soft bond regression model 112, and spinal cord/fat regression model 114) for the guided non-linear contrast transformation. The predicted tissue contrast image 108 is better for the performance of segmentation utilizing a deep learning-based segmentation model (e.g., global model 16 or local model 18). As noted above, a trained generative model may also be utilized for guided tissue contrast transformation between other pairs of cohorts (besides pediatric and adult) as long as there are variable contrast differences between the pair of cohorts. Also, the trained generative model may be utilized for other organs or anatomical structures (besides vertebrae) as long as different tissue types can be derived from the images.

Figure 11:
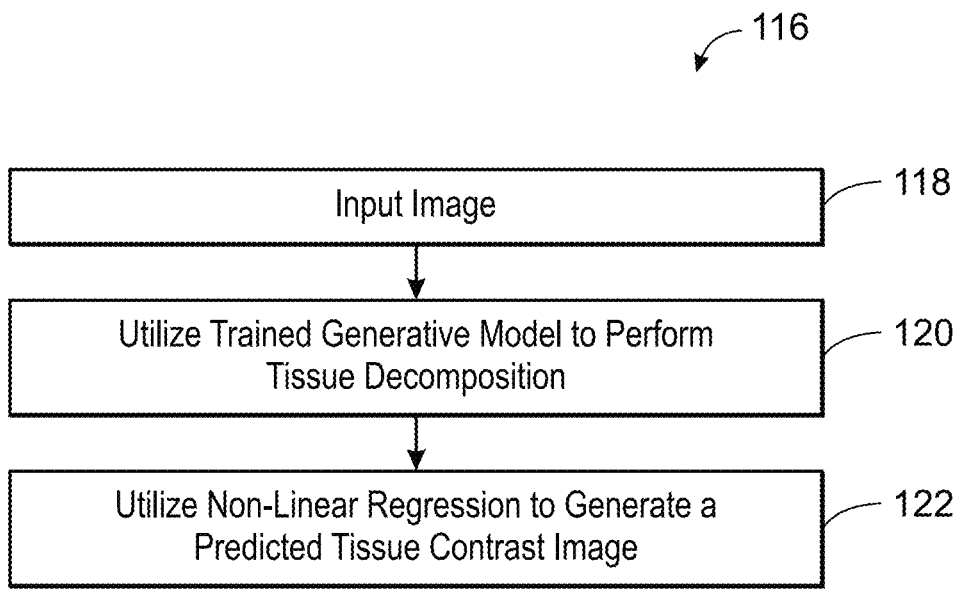
FIG. 11 is an embodiment of a flow chart of a method for utilizing a trained generative model for guided tissue contrast transformation between pediatric vertebrae magnetic resonance images and adult vertebrae magnetic resonance images, in accordance with aspects of the present disclosure.

FIG. 11 is an embodiment of a flow chart of a method 116 for utilizing a trained generative model for guided tissue contrast transformation between pediatric vertebrae magnetic resonance images and adult vertebrae magnetic resonance images. One or more components (e.g., processor-based devices 38 in FIG. 5) of the global site 12 and/or the local sites 14 in FIG. 2 may be utilized for performing the method 116. One or more steps of the method 116 may be performed simultaneously or in a different order from that depicted in FIG. 11. It is assumed in the continuous federated learning framework that global and local datasets are available at the global site and the local sites, respectively, and generated trained models. It also assumed that each local site includes a trained local model (e.g., trained on an actual local dataset) derived from the trained global model at the global site.

The method 116 includes inputting an image (e.g., test image) is inputted into a trained generative model (block 118). In certain embodiments, the image is derived from actual data at the global site or the local site. In certain embodiments, the inputted image is a pediatric vertebrae MR image (e.g., T2-weighted pediatric vertebrae MR image). In certain embodiments, the inputted image is an adult vertebrae MR image (e.g., T2-weighted adult vertebrae MR image). The method 116 also includes utilizing the trained generative model to automatically perform tissue specific decomposition (e.g., utilizing expectation maximization (EM)-based clustering) to identify different classes of tissue within the image (block 120). In particular, a bone/air decomposition image, a muscle/soft bone image, a muscle/spinal cord image, and a fat decomposition image are generated from the inputted image. The method 116 further includes, via the trained generative model, utilizing non-linear regression to generate a predicted tissue contrast image from the decomposition images (block 122). In certain embodiments (e.g., when the inputted image is a pediatric vertebrae MR image), the predicted tissue contrast image is a pediatric vertebrae MR image (e.g., T2-weighted pediatric vertebrae MR image) having a contrast/intensity that matches a contrast/intensity of an adult vertebrae MR image (e.g., T2-weighted adult vertebrae MR image). In certain embodiments (when the inputted image is an adult vertebrae MR image), the predicted tissue contrast image is an adult vertebrae MR image (e.g., T2-weighted adult vertebrae MR image) having a contrast/intensity that matches a contrast/intensity of a pediatric vertebrae MR image (e.g., T2-weighted pediatric vertebrae MR image). Thus, the trained generative model performs guided non-linear contrast transformation between pediatric and adult vertebrae MR images. In particular, the trained generative model utilizes tissue specific regression models (e.g., bone/air regression model, muscle/soft bond regression model, and spinal cord/fat regression model) for the guided non-linear contrast transformation. The predicted tissue contrast image is better for the performance of segmentation utilizing a deep learning-based segmentation model (e.g., global model 16 or local model 18). A similar method may also be utilized for guided tissue contrast transformation between other pairs of cohorts (besides pediatric and adult) as long as there are variable contrast differences between the pair of cohorts. Also, a similar method may be utilized for other organs or anatomical structures (besides vertebrae) as long as different tissue types can be derived from the images.

Figure 12:
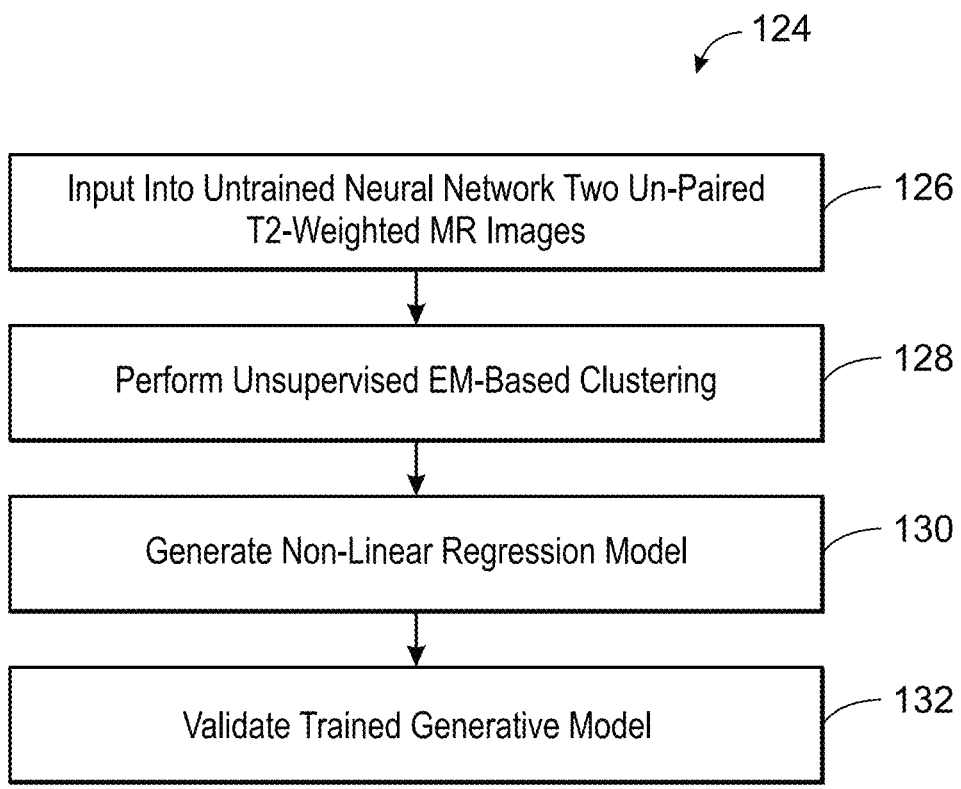
FIG. 12 is an embodiment of a flow chart of a method for training a generative model for guided tissue contrast transformation between pediatric vertebrae magnetic resonance images and adult vertebrae magnetic resonance images, in accordance with aspects of the present disclosure.

FIG. 12 is an embodiment of a flow chart of a method 124 for training a generative model for guided tissue contrast transformation between pediatric vertebrae magnetic resonance images and adult vertebrae magnetic resonance images. One or more components (e.g., processor-based devices 38 in FIG. 5) of the global site 12 and/or the local sites 14 in FIG. 2 may be utilized for performing the method 124. One or more steps of the method 124 may be performed simultaneously or in a different order from that depicted in FIG. 12. It is assumed in the continuous federated learning framework that global and local datasets are available at the global site and the local sites, respectively, and generated trained models.

The method 124 includes inputting into an untrained neural network two clinical un-paired T2-weighted MR images as the training dataset (block 126). The un-paired T2-weighted MR images include a T2-weighted pediatric vertebrae MR image and a T2-weighted adult vertebrae MR image. One of the images comes from the training dataset (e.g., at the local site) and the others from failure cases. In certain embodiments, the T2-weighted adult vertebrae MR image is from the training dataset and the T2-weighted pediatric vertebrae MR image is from the failure cases. In certain embodiments, the T2-weighted pediatric vertebrae MR image is from the training dataset and the T2-weighted adult vertebrae MR image is from the failure cases. The training dataset comes from the actual dataset at the local site. The method 124 includes performing unsupervised EM-based clustering on the two inputted un-paired T2-weighted MR images to identify different tissue classes (block 128). The different tissue classes include dense bone/air decomposition, a muscle/soft bone, muscle/spinal cord (vertebrae), and fat. The method 124 further includes generating from the two inputted un-paired T2-weighted MR images a non-linear random regression model (e.g., the trained generative model) that takes probabilities of individual classes (e.g., the tissue classes) from the failure case to predict T2-weighted intensity of the training case (block 130). The non-linear random regression model includes three tissue specific regression models (e.g., bone/air regression model, muscle/soft bond regression model, and spinal cord/fat regression model) for the guided non-linear contrast transformation of T2-weighted intensities/contrast to match contrast similar to a training dataset. The method 124 even further includes validating the trained generative model utilizing a new patient MRI image (e.g., vertebrae image) (e.g., acquired at the local site) (block 132). The EM-based clustering of the trained generative model identifies the tissues classes (e.g., via automatic tissue specific decomposition). The tissue specific regression models of the trained generative model are utilized to transform T2-weighted MR intensities of the new patient MRI image (e.g., test case) to be similar to (or match) the training values.

Figure 13:
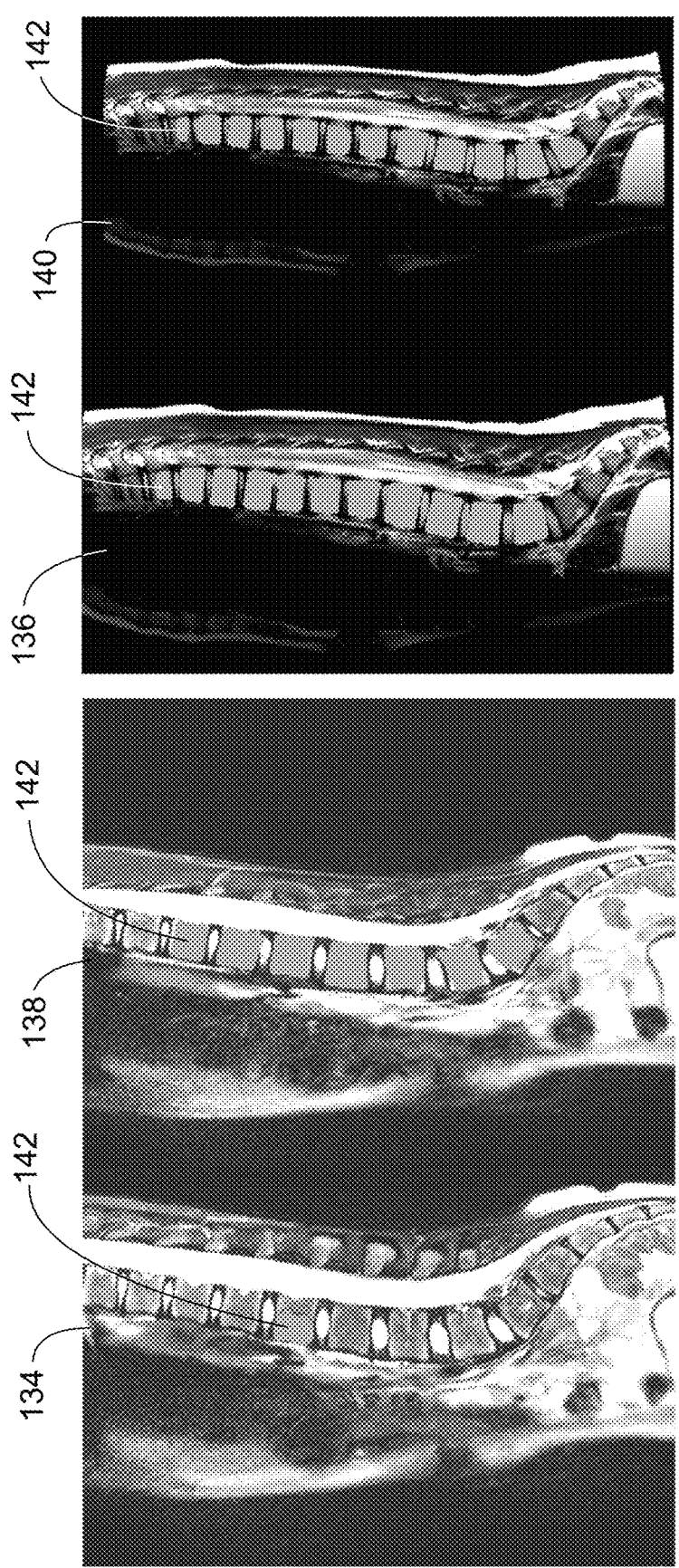
FIG. 13 illustrates examples of predictions from segmentation on original T2-weighted magnetic resonance images and transformed T2-weighted magnetic resonance images, in accordance with aspects of the present disclosure.

FIG. 13 illustrates examples of predictions from segmentation on original T2-weighted MR images and transformed T2-weighted MR images. Images 134 and 136 are predicted T2-weighted MR images derived from segmentation utilizing a deep learning-based model for segmentation of vertebrae in original (i.e., not subject to contrast transformation utilizing the trained generative model 94 in FIG. 10) T2-weighted pediatric vertebrae images. Corresponding images 138 and 140 are predicted T2-weighted MR images derived from segmentation utilizing the deep-learning based model for segmentation of vertebrae in transformed (i.e., generated from contrast transformation of the corresponding original T2-weighted MR images with the trained generative model 94 in FIG. 10) T2-weighted adult vertebrae images. The deep-learning based model utilized 3D UNET segmentation. The segmentation of the vertebrae (as indicated by labels 142) is improved in images 138 and 140 derived from transformed MR images.

Figure 14:
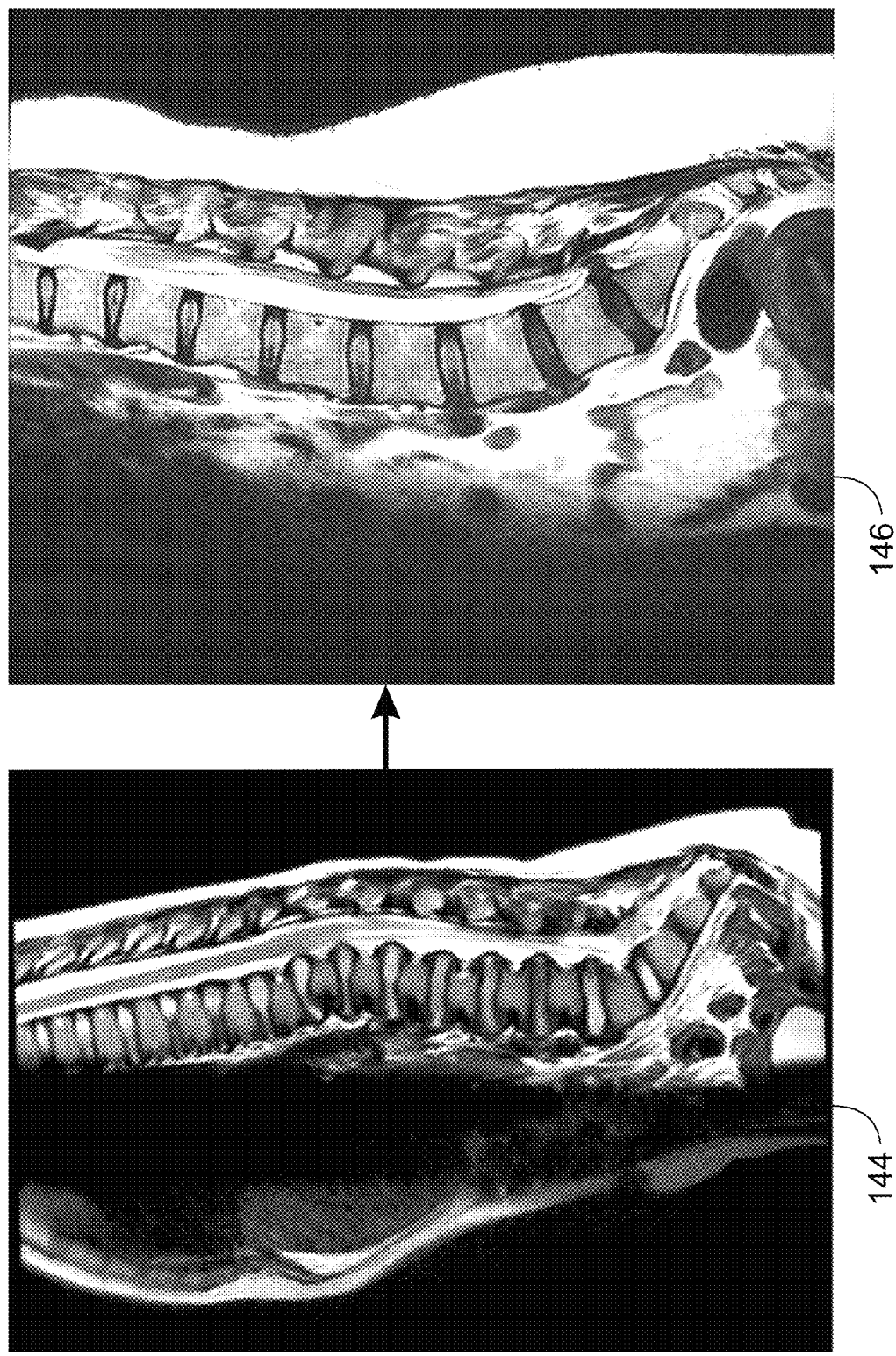
FIG. 14 illustrates an example of an un-paired dataset utilized for training a generative model for guided tissue contrast transformation between pediatric vertebrae magnetic resonance images and adult vertebrae magnetic resonance images, in accordance with aspects of the present disclosure.

FIG. 14 illustrates an example of an un-paired dataset utilized for training a generative model for guided tissue contrast transformation between pediatric vertebrae magnetic resonance images and adult vertebrae magnetic resonance images. Image 144 is a T2-weighted pediatric vertebrae MR image. Image 146 is a T2-weighted adult vertebrae MR image. Images 144 and 146 are utilized to train a generative model (e.g., generative model 94 in FIG. 10).

Figure 15:
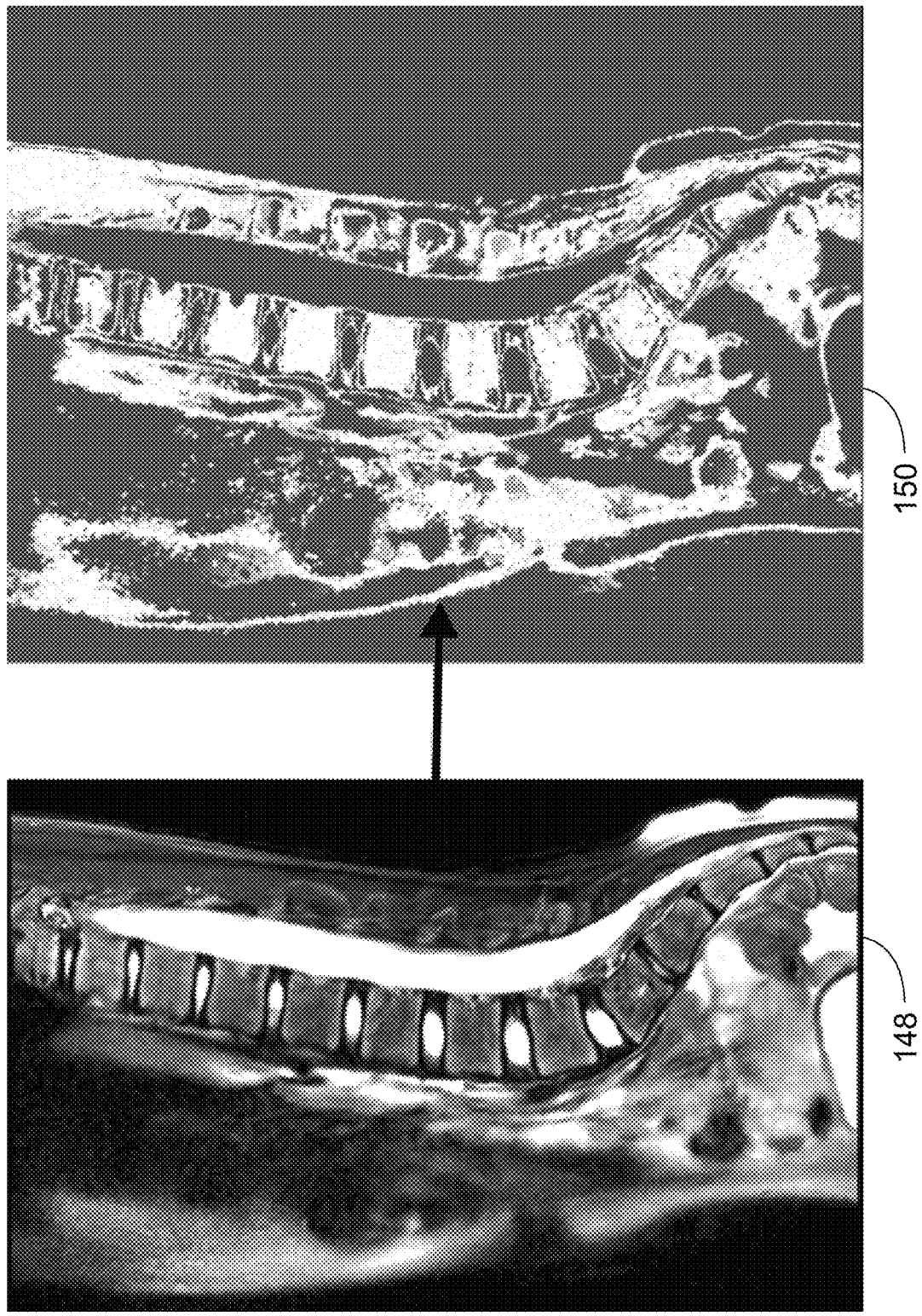
FIG. 15 illustrates the application of guided tissue contrast transformation to a pediatric vertebrae magnetic resonance image, in accordance with aspects of the present disclosure.

FIG. 15 illustrates the application of tissue contrast transformation to a pediatric vertebrae MR image. Image 148 is a T2-weighted pediatric vertebrae MR image. Image 150 is a transformed T2-weighted pediatric vertebrae MR image derived from the image 148 utilizing a trained generative model (e.g., generative model 94 in FIG. 10).

Figure 16:
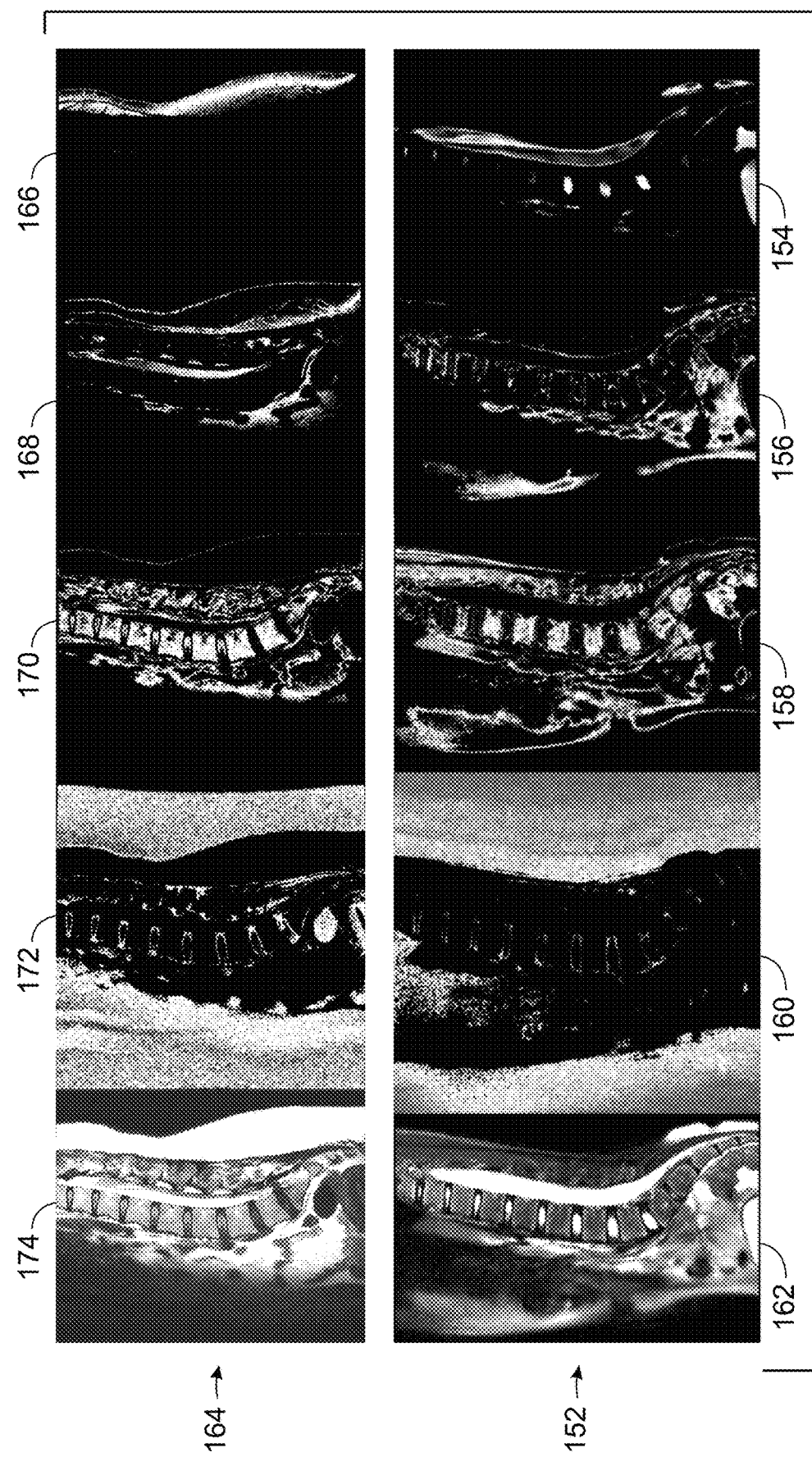
FIG. 16 illustrates different tissue decomposition images derived from adult and pediatric T2-weighted images for regression training, in accordance with aspects of the present disclosure.

FIG. 16 illustrates different tissue decomposition images derived from adult and pediatric T2-weighted images for regression training. Row 152 includes a T2-weighted adult vertebrae MR image 154. Row 152 also includes a bone/air decomposition image 156, a muscle/soft bone image 158, a muscle/spinal cord image 160, and a fat decomposition image 162 derived from image 154 (e.g., via EM-based clustering). Row 164 includes a T2-weighted adult vertebrae MR image 166. Row 164 also includes a bone/air decomposition image 168, a muscle/soft bone image 170, a muscle/spinal cord image 172, and a fat decomposition image 174 derived from image 166 (e.g., via EM-based clustering)

Technical effects of the disclosed subject matter include providing systems and methods for utilizing a continuous federated learning framework that utilizes training of local and global models with generated data similar to the actual local and global datasets mitigating the issue of catastrophic forgetting and data sharing concerns. The approach is operator independent and also provides local adaptation and site-specific customization. In addition, the approach reduces time related to retraining/testing, especially in areas (e.g., healthcare) where it is difficult to share training data. Further, the approach provides online learning of site-specific data.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f).

However, for any claims containing elements designated in any other manner, it is intended that such elements are not to be interpreted under 35 U.S.C. 112(f).

This written description uses examples to disclose the present subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A computer implemented method, comprising:
   establishing, via a plurality of processors, a continuous federated learning framework comprising a global model at a global site and respective local models derived from the global model at respective local sites;
   retraining or retuning, via the plurality of processors, the global model and the respective local models without sharing actual datasets between the global site and the respective local sites but instead sharing synthetic datasets generated from the actual datasets;
   generating, via one or more processors at the global site, a generative model configured to generate a synthetic global dataset from an actual dataset at the global site, and wherein the generative model is configured to perform guided non-linear contrast transformation between magnetic resonance (MR) images of an organ or anatomical structure from both a first cohort and a second cohort, wherein the first cohort is different from the second cohort; and
   providing, via the one or more processors at the global site, the generative model and the synthetic global dataset to each of the respective local sites.

2. The computer implemented method of claim 1, comprising retraining or retuning, via one or more processors at each respective local site, each respective local model utilizing both the synthetic global dataset and an actual local dataset at the respective local site to locally retune weights to generate a new respective local model, wherein the actual local dataset comprises a couple of un-paired T2-weighted MR images comprising a T2-weighted MR image of the organ or anatomical structure from the first cohort and a T2-weighted MR image of the organ or anatomical structure from the second cohort.

3. The computer implemented method of claim 2, comprising validating, via the one or more processors at each respective local site, each new respective local model utilizing an actual local test dataset at the respective local site without catastrophic forgetting.

4. The computer implemented method of claim 2, comprising generating, via the one or more processors at each respective local site, a respective local generative model configured to generate a respective synthetic local dataset from the actual local dataset at the respective local site, wherein the respective local generative model is configured to perform guided non-linear contrast transformation between MR images of the organ or anatomical structure from the first cohort and MR images of the organ or anatomical structure from the second cohort.

5. The computer-implemented method of claim 4, wherein the respective local generative model is configured to transform a contrast of MR images of the organ or anatomical structure of the first cohort to resemble a contrast of MR images of the organ or anatomical structure of the second cohort.

6. The computer-implemented method of claim 4, wherein the respective local generative model is configured to transform a contrast of MR images of the organ or anatomical structure of the second cohort to resemble a contrast of MR images of the organ or anatomical structure of the first cohort.

7. The computer-implemented method of claim 4, wherein the respective local generative model is a tissue specific non-linear regression model.

8. The computer-implemented method of claim 4, wherein the respective local generative model is configured, prior to performing guided non-linear contrast transformation, to utilize expectation maximization clustering to identify different tissue classes in MR images of the anatomical structure or organ.

9. A deep learning-based continuous federated learning network system, comprising:
   a global site comprising a global model;
   a plurality of local sites, wherein each respective local site of the plurality of local sites comprises a respective local model derived from the global model; and
   a plurality of processors configured to:
   retrain or retune the global model and the respective local models without sharing actual datasets between the global site and the respective local sites but instead sharing synthetic datasets generated from the actual datasets;
   generate a generative model configured to generate a synthetic global dataset from an actual dataset at the global site, and wherein the generative model is configured to perform guided non-linear contrast transformation between magnetic resonance (MR) images of an organ or anatomical structure from both a first cohort and a second cohort, wherein the first cohort is different from the second cohort; and
   provide the generative model and the synthetic global dataset to each of the respective local sites.

10. The system of claim 9, wherein, at each respective local site, one or more processors of the plurality of processors are configured to:
    retrain or retune the respective local model utilizing both the synthetic global dataset and an actual local dataset at the respective local site to locally retune weights to generate a new respective local model, wherein the actual local dataset comprises a couple of un-paired T2-weighted MR images comprising a T2-weighted MR image of the organ or anatomical structure from the first cohort and a T2-weighted MR image of the organ or anatomical structure from the second cohort; and
    validate the new respective local model utilizing an actual local test dataset at the respective local site.

11. The system of claim 10, wherein, at each respective local site, one or more processors of the plurality of processors are configured to:
    generate a respective local generative model configured to generate a respective synthetic local dataset from the actual local dataset at the respective local site, wherein the respective local generative model is configured to perform guided non-linear contrast transformation between MR images of the organ or anatomical structure from the first cohort and MR images of the organ or anatomical structure from the second cohort; and provide the respective local generative model, the new respective local model, and the respective synthetic local dataset to the global site.

12. The system of claim 11, wherein the respective local generative model is configured to transform a contrast of MR images of the organ or anatomical structure of the first cohort to resemble a contrast of MR images of the organ or anatomical structure of the second cohort.

13. The system of claim 11, wherein the respective local generative model is configured to transform a contrast of MR images of the organ or anatomical structure of the second cohort to resemble a contrast of MR images of the organ or anatomical structure of the first cohort.

14. The system of claim 11, wherein the respective local generative model is a tissue specific non-linear regression model.

15. The system of claim 11, wherein the respective local generative model is configured, prior to performing guided non-linear contrast transformation, to utilize expectation maximization clustering to identify different tissue classes in MR images of the organ or anatomical structure.

16. A non-transitory computer-readable medium, the computer-readable medium comprising processor-executable code that when executed by one or more processors, causes the one or more processors to:
establish a continuous federated learning framework comprising a global model at a global site and respective local models derived from the global model at respective local sites;
retrain or retune the global model and the respective local models without sharing actual datasets between the global site and the respective local sites but instead sharing synthetic datasets generated from the actual datasets;
generate a generative model configured to generate a synthetic global dataset from an actual dataset at the global site, and wherein the generative model is configured to perform guided non-linear contrast transformation between pediatric and adult vertebrae magnetic resonance (MR) images; and
provide the generative model and the synthetic global dataset to each of the respective local sites.

17. The non-transitory computer-readable medium of claim 16, wherein the processor-executable code that when executed by one or more processors, causes the one or more processors to generate a respective local generative model configured to generate a respective synthetic local dataset from the actual local dataset at the respective local site, wherein the respective local generative model is configured to perform guided non-linear contrast transformation between pediatric and adult vertebrae MR images.

18. The non-transitory computer-readable medium of claim 17, wherein the respective local generative model is configured to transform a contrast of pediatric vertebrae MR images to resemble a contrast of adult vertebrae MR images.

19. The non-transitory computer-readable medium of claim 17, wherein the respective local generative model is configured to transform a contrast of adult vertebrae MR images to resemble a contrast of adult vertebrae MR images.

20. The non-transitory computer-readable medium of claim 17, wherein the respective local generative model is a tissue specific non-linear regression model.

* * * * *